United States Patent
Park et al.

(10) Patent No.: US 11,575,132 B2
(45) Date of Patent: Feb. 7, 2023

(54) METHOD OF PREPARING ELECTRODE FOR SECONDARY BATTERY, AND SECONDARY BATTERY INCLUDING THE ELECTRODE

(71) Applicant: SK INNOVATION CO., LTD., Seoul (KR)

(72) Inventors: Sung Jun Park, Daejeon (KR); Byoung Wook Jo, Daejeon (KR)

(73) Assignee: SK ON CO., LTD., Seoul (KR)

( * ) Notice: Subject to any disclaimer, the term of this patent is extended or adjusted under 35 U.S.C. 154(b) by 310 days.

(21) Appl. No.: 16/842,369

(22) Filed: Apr. 7, 2020

(65) Prior Publication Data

US 2020/0388849 A1    Dec. 10, 2020

(30) Foreign Application Priority Data

Jun. 7, 2019 (KR) .................. 10-2019-0067100

(51) Int. Cl.
| | |
|---|---|
| *H01M 4/62* | (2006.01) |
| *H01M 4/04* | (2006.01) |
| *H01M 10/0525* | (2010.01) |
| *H01M 4/02* | (2006.01) |

(52) U.S. Cl.
CPC ......... *H01M 4/621* (2013.01); *H01M 4/0404* (2013.01); *H01M 10/0525* (2013.01); *H01M 2004/021* (2013.01)

(58) Field of Classification Search
CPC .............. H01M 4/0404; H01M 4/621; H01M 10/0525; H01M 2004/021
USPC ........................................................ 429/217
See application file for complete search history.

(56) References Cited

U.S. PATENT DOCUMENTS

| 10,069,145 B1 * | 9/2018 | Schroder .................. H01G 9/04 |
| 2004/0234851 A1 | 11/2004 | Kim et al. |
| 2011/0206985 A1 | 8/2011 | Ishihara et al. |
| 2016/0099483 A1 * | 4/2016 | Lee ........................ H01M 4/623 |
| | | 429/233 |

(Continued)

FOREIGN PATENT DOCUMENTS

| EP | 3276714 A1 | 1/2018 |
| JP | 2002-367601 A | 12/2002 |
| JP | 2015-153658 A | 8/2015 |

(Continued)

OTHER PUBLICATIONS

Extended European Search Report issued by the European Patent Office dated Oct. 15, 2020.

(Continued)

*Primary Examiner* — James M Erwin
(74) *Attorney, Agent, or Firm* — IP & T Group LLP

(57) ABSTRACT

A method of manufacturing an electrode for a secondary battery includes preparing an electrode current collector in which a plurality of through-holes are formed; applying a first slurry including an electrode active material, a binder, and a conductive material to at least one surface of the electrode current collector; and applying a second slurry including an electrode active material, a binder, and a conductive material on the first slurry. In manufacturing an electrode including an electrode current collector with a plurality of through-holes, processability may be secured by preventing leakage of a slurry, and thus, a uniform electrode mixture layer may be formed.

12 Claims, 1 Drawing Sheet

(56) References Cited

U.S. PATENT DOCUMENTS

2020/0058930 A1* 2/2020 Otohata ............. H01M 4/0471
2020/0194779 A1 6/2020 Kawaguchi

FOREIGN PATENT DOCUMENTS

| KR | 10-2015-0071453 A | 6/2015 |
| KR | 10-2017-0135423 A | 12/2017 |
| KR | 10-2018-0025586 A | 3/2018 |
| WO | 2018/008953 A1 | 1/2018 |
| WO | 2018/186017 A1 | 10/2018 |
| WO | 2019/039332 A1 | 2/2019 |
| WO | 2019/102900 A1 | 5/2019 |

OTHER PUBLICATIONS

Office Action issued by the Korean Intellectual Property Office for KR 10-2019-0067100 dated May 27, 2022.
Extended European Search Report for the European Patent Application No. 22162568.4 issued by the European Patent Office dated Jul. 8, 2022.

* cited by examiner

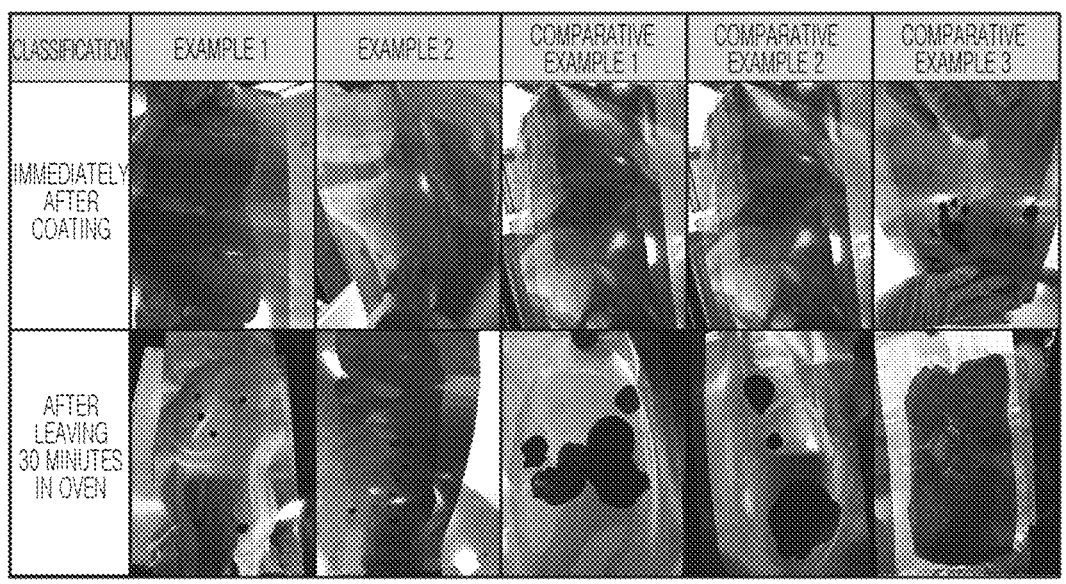

METHOD OF PREPARING ELECTRODE FOR SECONDARY BATTERY, AND SECONDARY BATTERY INCLUDING THE ELECTRODE

CROSS-REFERENCE TO RELATED APPLICATION(S)

This application claims the benefit under 35 USC 119(a) of Korean Patent Application No. 10-2019-0067100 filed on Jun. 7, 2019 in the Korean Intellectual Property Office, the entire disclosure of which is incorporated herein by reference for all purposes.

BACKGROUND

The present disclosure relates to a method of manufacturing an electrode for a secondary battery, and a secondary battery including the electrode, and more particularly, to a multilayer electrode formed by applying a slurry having different viscosity on an electrode current collector in which a plurality of through-holes are formed, and a method of manufacturing the same.

With the development of technology and demand for mobile devices, the demand for secondary batteries as an energy source has rapidly increased, and recently, the use of secondary batteries as a power source for electric vehicles (EV) and hybrid electric vehicles (HEV) has been realized. Among such secondary batteries, there is a high demand for lithium secondary batteries having high energy density, high discharge voltage, and output stability.

In general, a lithium secondary battery is manufactured by using a material capable of inserting and removing lithium ions as a negative electrode and a positive electrode and by charging an organic electrolyte or a polymer electrolyte between the positive electrode and the negative electrode, and electrical energy is generated by oxidation and reduction reactions when lithium ions are inserted and desorbed from the positive electrode and the negative electrode.

In this case, the negative electrode and the positive electrode include an electrode mixture layer on the current collector of each electrode. For example, a slurry is prepared by mixing and stirring a binder, a solvent, and a conductive material and a dispersant as needed, in the electrode active material, and then, electrodes may be prepared by applying the slurry to a current collector of a metallic material, followed by being compressed and dried.

In the process of manufacturing such an electrode, the development of a high-capacity battery has been required by expanding application of a lithium secondary battery to an electric vehicle, etc., thus increasing the load on the electrode mixture layer. However, the increased volume and weight of the electrode mixture layer lowers the energy density of the entire secondary battery, and there is a problem that causes non-uniformity of the electrochemical reaction inside the electrode mixture layer. Moreover, when a current or voltage is applied, a concentration gradient of lithium ions in the electrode occurs. In the thick electrode mixture layer, this phenomenon is further exacerbated, causing deterioration of rapid charging characteristics.

Therefore, a method of obtaining the capacity of a secondary battery having a thick electrode mixture layer by laminating several layers of thin electrodes rather than thickly applying an electrode mixture layer on one current collector has been proposed. However, in this case, to preserve the movement of lithium ions, a current collector having pores having a specific porosity or higher or openings having a specific aperture ratio or higher is used. In addition, the current collector in which the pores or openings are formed may significantly reduce the weight of the entire secondary battery, and thus, the use in future is further expected.

However, when the slurry is applied during the electrode manufacturing process, there is a problem in that the slurry leaks to the opposite side of the coated surface, resulting in surface irregularity of the electrode mixture layer, and failing to form a uniform electrode mixture layer, due to the high porosity or aperture ratio.

SUMMARY

An aspect of the present disclosure is to provide a method of manufacturing an electrode for a secondary battery, in which processability may be secured by preventing leakage of a slurry in manufacturing an electrode including an electrode current collector in which a plurality of through-holes are formed, and thus, a uniform electrode mixture layer may be formed, and to provide an electrode for a secondary battery, manufactured by the method.

According to an aspect of the present disclosure, a method of manufacturing an electrode for a secondary battery includes preparing an electrode current collector in which a plurality of through-holes are formed, applying a first slurry including an electrode active material, a binder, and a conductive material to at least one surface of the electrode current collector, and applying a second slurry including an electrode active material, a binder, and a conductive material on the first slurry. Viscosity of the first slurry is greater than viscosity of the second slurry.

The viscosity of the first slurry may be 10000 cp to 15000 cp.

The viscosity of the second slurry may be 3000 cp to 7000 cp.

A solid content weight of the first slurry may be 51 to 55% by weight.

A solid content weight of the second slurry may be 45 to 50% by weight.

The first slurry may further include a thickener.

The second slurry may further include a thickener in a weight less than a weight of the thickener included in the first slurry.

The thickener included in the first slurry may be included in an amount of 0.5 to 2% by weight, based on a total weight of the first slurry.

The thickener may be at least one selected from carboxy methyl cellulose (CMC), methyl cellulose (MC), hydroxypropyl cellulose (HPC), methyl hydroxypropyl cellulose (MHPC), ethyl hydroxyethyl cellulose (EHEC), methyl ethyl hydroxyethyl cellulose (MEHEC) and cellulose gum.

According to an aspect of the present disclosure, a secondary battery includes an electrode current collector in which a plurality of through-holes are formed, a first electrode mixture layer provided by coating at least one surface of the electrode current collector with a first slurry including an electrode active material, a binder, a conductive material, and a thickener, and a second electrode mixture layer provided by applying a second slurry including an electrode active material, a binder, and a conductive material on the first electrode mixture layer.

The second slurry may further include a thickener in a weight less than a weight of a thickener included in the first slurry.

The thickener included in the first slurry may be included in 0.5 to 2% by weight, based on a total weight of the first slurry.

The thickener may be at least one selected from carboxy methyl cellulose (CMC), methyl cellulose (MC), hydroxypropyl cellulose (HPC), methyl hydroxypropyl cellulose (MHPC), ethyl hydroxyethyl cellulose (EHEC), methyl ethyl hydroxyethyl cellulose (MEHEC) and cellulose gum.

BRIEF DESCRIPTION OF DRAWINGS

The above and other aspects, features, and advantages of the present disclosure will be more clearly understood from the following detailed description, taken in conjunction with the accompanying drawings, in which:

FIG. 1 is an experimental result of observing the degree of leakage coating the slurry according to Examples of the present disclosure and Comparative Examples.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Throughout the specification, it will be understood that when an element, such as a layer, region or wafer (substrate), is referred to as being "on," "connected to," or "coupled to" another element, it may be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

The drawings may not be to scale, and the relative size, proportions, and depiction of elements in the drawings may be exaggerated for clarity, illustration, and convenience.

Hereinafter, exemplary embodiments will be described with reference to various examples. However, embodiments of the present disclosure may be modified in various other forms, and the scope of the present disclosure is not limited to the embodiments described below.

An electrode for a secondary battery according to an exemplary embodiment and a method of manufacturing the same are provided. In detail, a multilayer electrode formed by applying a slurry having a different viscosity on an electrode current collector having a plurality of through-holes, and a method of manufacturing the same, are provided.

According to an exemplary embodiment, a method of manufacturing an electrode for a secondary battery is provided. The method of manufacturing an electrode for a secondary battery may include preparing an electrode current collector in which a plurality of through-holes are formed; applying a first slurry including an electrode active material, a binder, and a conductive material to at least one surface of the electrode current collector; and applying a second slurry including an electrode active material, a binder, and a conductive material on the first slurry. Viscosity of the first slurry is greater than viscosity of the second slurry. The electrode may be a negative electrode or a positive electrode.

In an exemplary embodiment, the current collector may be a current collector in a form in which a plurality of through-holes are perforated at a predetermined interval in a metal foil, and is not particularly limited as long as it has such a shape, but a metal foil in which a diameter of the through-hole is 50 μm to 200 μm and a pitch between the through-holes is 100 μm to 800 μm may be used.

Outside the above range, if the diameter of the through-holes is relatively too small or the average interval is relatively too large, it is difficult to have a required porosity, and thus it is difficult to manufacture, while if the average diameter of the through-holes is too large or if the average spacing between the through-holes is too small, the strength of the current collector itself may be relatively weak, and thus the support of the electrode mixture layer may be difficult.

The electrode for a secondary battery according to an exemplary embodiment may be a positive electrode or a negative electrode. Although not particularly limited, in the case of a positive electrode, a thin plate made of aluminum may be used as the current collector, and in the case of a negative electrode, a thin plate made of copper may be used as the current collector.

As described above, to form an electrode mixture layer on one surface of an electrode current collector in which a plurality of through-holes are formed, when a slurry including an electrode active material, a binder and a conductive material is applied, a phenomenon in which the slurry leaks through the through-holes may occur, and accordingly, a surface unevenness of the electrode mixture layer may occur, and problems such as contamination of a coater for applying the slurry may occur.

Accordingly, the method of manufacturing an electrode for a secondary battery according to an exemplary embodiment may be provided. The method may include applying a first slurry including an electrode active material, a binder, and a conductive material to at least one surface of the electrode current collector; and applying a second slurry including an electrode active material, a binder, and a conductive material on the first slurry. In this case, viscosity of the first slurry is greater than viscosity of the second slurry.

To prevent leakage of the slurry through the through-holes, the first slurry may have a viscosity of 10000 cp or higher, but if the viscosity is too high, it may be difficult to secure coating processability, and therefore, the first slurry may have, in detail, a viscosity of 10000 cp to 15000 cp.

To prepare a slurry having the above-mentioned viscosity, the solid content weight of the first slurry may be 51 to 55% by weight. In an exemplary embodiment, the solid content means the total amount of components excluding the solvent component from the slurry composition containing an electrode active material, a binder and a conductive material. In the case in which the solid content weight of the first slurry is less than 51%, the viscosity is less than 10000 cp, and thus, it is difficult to prevent the leakage of the slurry, whereas in the case in which the first slurry exceeds 55%, the viscosity becomes too high, and there is a problem in which securing coating processability is difficult.

The second slurry may be 7000 cp or less to secure processability. However, if it is less than 3000 cp, since the viscosity is relatively too low, since there is a problem in which the coating processability is further reduced, the second slurry may have a viscosity of 3000 cp to 7000 cp.

To prepare a slurry having the above-described viscosity, the solid content weight of the second slurry may be 45 to 50% by weight. In the case in which the solid content weight of the second slurry is less than 45%, a viscosity of less than 4000 cp is exhibited, which causes difficulty in securing coating processability.

According to another embodiment, a thickener may be additionally added to the first slurry to increase the viscosity of the first slurry. In addition, a thickener may be further added to the second slurry, as required. However, in this case, the thickener included in the second slurry may be included in a smaller weight than the thickener included in the first slurry. In addition, the types of thickeners included in the first slurry and the second slurry may be the same, or may be different.

The thickener is not particularly limited, and for example, may be one or more selected from carboxy methyl cellulose (CMC), methyl cellulose (MC), hydroxypropyl cellulose (HPC), methyl hydroxypropyl cellulose (MHPC), ethyl hydroxyethyl cellulose (EHEC), methyl ethyl hydroxyethyl cellulose (MEHEC), and cellulose gum.

In addition, the thickener may be included in 0.5 to 2% by weight, based on the total weight of the first slurry. If less than 0.5% by weight, it is difficult to secure a viscosity that may prevent the leakage of the slurry, while if it is more than 2% by weight, since the viscosity is relatively too high, there is a problem in which the coating processability is rather inhibited.

On the other hand, the electrode active materials included in the first slurry and the second slurry may be the same as or different from each other. When the electrode is a positive electrode, the positive electrode active material is not particularly limited, but for example, may be at least one selected from lithium cobalt oxide, lithium nickel oxide, lithium manganese oxide, lithium copper oxide, a compound having an olivine crystal structure, such as $LiFePO_4$, $LiMnPO_4$, $LiCoPO_4$, $LiNiPO_4$, or the like, vanadium oxide, and disulfide compounds.

When the electrode is a negative electrode, one or more selected from artificial graphite, natural graphite, soft carbon, hard carbon acetylene carbon black, ketjen black, carbon nanotube, carbon nanofiber, and silicon oxide may be used as the negative electrode active material.

The binder included in the first slurry and the second slurry may also be the same as or different from each other. The binder is a component that assists in the bonding of the active material and the conductive material or the like, and in the bonding to the current collector, and a material used as the binder is not particularly limited. For example, the material of the binder may be polyvinylidene fluoride (PVDF), polyvinyl alcohol, carboxy methyl cellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene-butylene rubber (SBR), fluorine rubber, mussel protein, a polyacrylate-based binder, a polyolefin-based binder, or a silane-based binder. In detail, at least one selected from PVDF, SBR, mussel protein, a polyolefin-based binder, a polyacrylate-based binder and a silane-based binder may be used.

The conductive materials included in the first slurry and the second slurry may also be the same as or different from each other. The conductive material is a material to improve electronic conductivity, and is not particularly limited as long as it has conductivity without causing chemical changes in the battery. For example, as the conductive material, graphite, such as natural graphite, artificial graphite or the like; carbon black such as acetylene black, ketjen black, channel black, furnace black, lamp black, summer black or the like; conductive fibers such as carbon fibers and metal fibers; metal powder such as carbon fluoride, aluminum and nickel powder, conductive whisker such as zinc oxide and potassium titanate, a conductive metal oxide such as titanium oxide, or a conductive material such as polyphenylene derivative, carbon nanotubes and graphene may be used.

The solvents included in the first slurry and the second slurry may also be the same as or different from each other. The type of the solvent is not particularly limited, and for example, may be at least one selected from acetone, tetrahydrofuran, methylene chloride, chloroform, dimethylformamide, N-methyl-2-pyrrolidone (NMP), cyclohexane and water.

According to another embodiment, an electrode for a secondary battery manufactured according to the above method is provided. In detail, the electrode for a secondary electrode includes an electrode current collector in which a plurality of through-holes are formed; a first electrode mixture layer formed by coating a first slurry including an electrode active material, a binder, a conductive material, and a thickener on at least one surface of the electrode current collector; and a second electrode mixture layer formed by applying a second slurry including an electrode active material, a binder, and a conductive material on the first electrode mixture layer. A viscosity of the first slurry is greater than a viscosity of the second slurry.

As described above, according to an exemplary embodiment, the processability may be secured by preventing leakage of a slurry, and accordingly, an electrode for a secondary battery having a uniform electrode mixture layer may be manufactured.

EXAMPLES

Hereinafter, an exemplary embodiment of the present disclosure will be described in more detail with Examples. The following examples are intended to illustrate the present disclosure in more detail, but the present disclosure is not limited thereby.

Example 1

As a negative electrode current collector, a copper thin plate having a thickness of 8 μm was prepared, and as a negative electrode active material on one surface of the copper thin plate, the first slurry including 96 parts by weight of graphite, 1.5 parts by weight of carboxymethyl cellulose as a binder, 1.5 parts by weight of SBR binder, and 1 part by weight of carbon black as a conductive material, was applied by a slot die coating method. The solid content of the first slurry was 55%, and the viscosity of the first slurry measured by Brookfield viscometer pin 3 at 30 rpm was 15,000 cp.

Subsequently, a second slurry including 97 parts by weight of graphite, 1 part by weight of carboxymethyl cellulose as a binder, 1.5 parts by weight of SBR binder, and 1 part by weight of carbon black as a conductive material was applied to the first slurry by a slot die coating method. The solid content of the second slurry was 55%, and the second slurry had a viscosity of 7,000 cp.

Example 2

Except that 96 parts by weight of graphite, 1.5 parts by weight of carboxymethyl cellulose as a binder, 1.5 parts by weight of SBR binder, and 1 part by weight of carbon black as a conductive material were used as the negative electrode active material of the first slurry; the first and second slurries were applied in the same manner as in Example 1. The solid content of the first slurry was 54% and the viscosity thereof was 14000 cp.

Comparative Example 1

Except that 96 parts by weight of graphite, 1.5 parts by weight of carboxymethyl cellulose as a binder, 1.5 parts by weight of SBR binder, and 1 part by weight of carbon black as a conductive material were used as the negative electrode active material of the first slurry; the first and second slurries were applied in the same manner as in Example 1. The solid content of the first slurry was 48% and the viscosity was 4867 cp.

Comparative Example 2

Except that 96 parts by weight of graphite, 1.5 parts by weight of carboxymethyl cellulose as a binder, 1.5 parts by weight of SBR binder, and 1 part by weight of carbon black as a conductive material were used as the negative electrode active material of the first slurry; the first and second slurries were applied in the same manner as in Example 1. The solid content of the first slurry was 47% and the viscosity was 4000 cp.

Comparative Example 3

Except that 96 parts by weight of graphite, 1.5 parts by weight of carboxymethyl cellulose as a binder, 1.5 parts by weight of SBR binder, and 1 part by weight of carbon black as a conductive material were used as the negative electrode active material of the first slurry; the first and second slurries were applied in the same manner as in Example 1. The solid content of the first slurry was 46% and the viscosity was 3000 cp.

Images captured immediately after coating of the copper thin plates with the first and second slurries, prepared according to Examples 1 and 2, and Comparative Examples 1 to 3, and images of the copper thin plates captured after an elapse of 30 minutes after placing the copper thin plate in an oven, are illustrated in FIG. 1. In Examples 1 and 2 of the present disclosure, it was confirmed that the leakage of the first slurry was relatively small, thereby ensuring processability.

As set forth above, according to exemplary embodiments, in manufacturing an electrode including an electrode current collector with a plurality of through-holes, processability may be secured by preventing leakage of a slurry, and thus, a uniform electrode mixture layer may be formed.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of manufacturing an electrode for a secondary battery, comprising:
   preparing an electrode current collector in which a plurality of through-holes are formed;
   applying a first slurry including a first electrode active material, a first binder, a first conductive material, and a first thickener to at least one surface of the electrode current collector; and
   applying a second slurry including a second electrode active material, a second binder, and a second conductive material on the first slurry,
   wherein viscosity of the first slurry is greater than viscosity of the second slurry,
   wherein the first thickener included in the first slurry is included in an amount of 0.5 to 2% by weight, based on a total weight of the first slurry, and
   wherein the first and second electrode active materials are the same or different, the first and second binders are the same or different, and the first and second conductive materials are the same or different.

2. The method of claim 1, wherein the viscosity of the first slurry is 10000 cp to 15000 cp.

3. The method of claim 1, wherein the viscosity of the second slurry is 5000 cp to 7000 cp.

4. The method of claim 1, wherein a solid content weight of the first slurry is 51 to 55% by weight.

5. The method of claim 1, wherein a solid content weight of the second slurry is 45 to 50% by weight.

6. The method of claim 1, wherein the second slurry further comprises a second thickener in a weight less than a weight of the first thickener included in the first slurry,
   wherein the first thickener is the same as or different from the second thickener.

7. The method of claim 1, wherein the first thickener is at least one selected from carboxy methyl cellulose (CMC), methyl cellulose (MC), hydroxypropyl cellulose (HPC), methyl hydroxypropyl cellulose (MHPC), ethyl hydroxyethyl cellulose (EHEC), methyl ethyl hydroxyethyl cellulose (MEHEC) and cellulose gum.

8. The method of claim 6, wherein the second thickener is at least one selected from carboxy methyl cellulose (CMC), methyl cellulose (MC), hydroxypropyl cellulose (HPC), methyl hydroxypropyl cellulose (MHPC), ethyl hydroxyethyl cellulose (EHEC), methyl ethyl hydroxyethyl cellulose (MEHEC) and cellulose gum.

9. A secondary battery comprising:
an electrode current collector in which a plurality of through-holes are formed;
a first electrode mixture layer provided by coating at least one surface of the electrode current collector with a first slurry including a first electrode active material, a first binder, a first conductive material, and a first thickener; and
a second electrode mixture layer provided by applying a second slurry including a second electrode active material, a second binder, and a second conductive material on the first electrode mixture layer,
wherein the first thickener included in the first slurry is included in an amount of 0.5 to 2% by weight, based on a total weight of the first slurry, and
wherein the first and second electrode active materials are the same or different, the first and second binders are the same or different, and the first and second conductive materials are the same or different.

10. The secondary battery of claim 9, wherein the second slurry further comprises a second thickener in a weight less than a weight of the first thickener included in the first slurry, wherein the first thickener is the same as or different from the second thickener.

11. The secondary battery of claim 9, wherein the first thickener is at least one selected from carboxy methyl cellulose (CMC), methyl cellulose (MC), hydroxypropyl cellulose (HPC), methyl hydroxypropyl cellulose (MHPC), ethyl hydroxylethyl cellulose (EHEC), methyl ethyl hydroxyethyl cellulose (MEHEC) and cellulose gum.

12. The secondary battery of claim 10, wherein the second thickener is at least one selected from carboxy methyl cellulose (CMC), methyl cellulose (MC), hydroxypropyl cellulose (HPC), methyl hydroxypropyl cellulose (MHPC), ethyl hydroxylethyl cellulose (EHEC), methyl ethyl hydroxyethyl cellulose (MEHEC) and cellulose gum.

* * * * *